United States Patent
Wu et al.

(10) Patent No.: US 9,120,903 B2
(45) Date of Patent: *Sep. 1, 2015

(54) MECHANICAL MIXING PROCESSES

(71) Applicant: Xerox Corporation, Norwalk, CT (US)

(72) Inventors: Jin Wu, Pittsford, NY (US); Kyle B. Tallman, Perry, NY (US); Qi Ying Li, Ontario (CA); Lin Ma, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 74 days.

This patent is subject to a terminal disclaimer.

(21) Appl. No.: 14/027,214

(22) Filed: Sep. 15, 2013

(65) Prior Publication Data

US 2015/0076417 A1    Mar. 19, 2015

(51) Int. Cl.
*H01B 1/12* (2006.01)
*C08J 3/00* (2006.01)
*C08J 3/20* (2006.01)

(52) U.S. Cl.
CPC .. *C08J 3/005* (2013.01); *C08J 3/20* (2013.01); *C08J 2379/08* (2013.01); *H01B 1/128* (2013.01)

(58) Field of Classification Search
CPC .......................................... H01B 1/128
USPC ........................................... 252/500
See application file for complete search history.

(56) References Cited

U.S. PATENT DOCUMENTS

| 4,885,350 | A | * | 12/1989 | Yamashita et al. | 526/201 |
| 2009/0324959 | A1 | * | 12/2009 | Wu | 428/421 |
| 2010/0247918 | A1 | * | 9/2010 | Wu | 428/411.1 |
| 2012/0049123 | A1 | * | 3/2012 | Wu | 252/500 |

* cited by examiner

*Primary Examiner* — Harold Pyon
*Assistant Examiner* — William Young
(74) *Attorney, Agent, or Firm* — Eugene O. Palazzo

(57) ABSTRACT

A ball milling free and roll milling free process that includes the mechanical mixing of a mixture of ingredients comprising a polymer, a perfluoropolyether phosphate, a conductive component, and a solvent.

21 Claims, 1 Drawing Sheet

MECHANICAL MIXING PROCESSES

CROSS REFERENCE TO RELATED APPLICATION

Copending U.S. application Ser. No. 14/027,212, filed concurrently herewith, entitled Intermediate Transfer Members, the disclosure of which is totally incorporated herein by reference, illustrates an intermediate transfer member comprised of a polyimide, an optional conductive filler, and a perfluoropolyether phosphate.

The present disclosure is generally directed to a ball milling-free and roll milling-free process comprising the mechanical mixing of a mixture of ingredients comprising a polymer, or a monomeric or polymerizable component that converts to a polymer, a perfluoropolyether phosphate, a conductive component, and a solvent.

BACKGROUND

Various milling processes are known for the preparation of dispersions that can be selected as films and coatings for substrates. Two known milling processes are wet milling and dry milling. To optimize these processes agitator speeds are sometimes increased and there is used finer size grinding media.

Utilization of milling methods, such as ball milling, can be an extremely costly and a time consuming procedure, requiring in some instances 20 to 40 hours to complete and to provide dispersions that generate films with sufficient chemical, physical, and functional stability.

In one known milling method, there is selected a grinder, such as a ball mill, where an inclined or horizontal rotating cylinder is partially filled with ceramic balls, flint pebbles, and/or stainless steel balls, each of which grinds materials to the necessary fineness by friction and impact with the tumbling balls. An internal cascading effect reduces the material present to a fine powder, and where large to medium-sized ball mills are mechanically rotated on their axes. High quality ball milling processes are costly and may not be environmentally acceptable over extended usage in that grinding media residues result that need to be disposed of and that can contaminate the devices used and the materials being treated. Because of the high important speeds usually needed with ball milling there can be problems with the materials present to rotate along the direction of the cylindrical device resulting in no further grinding.

A planetary ball mill, smaller in size than common ball mills are mainly used in laboratories for grinding sample materials down to very small particle sizes. The grinding steel balls in the grinding container are subjected to superimposed rotational movements, with the differences in speeds between the balls and grinding containers producing an interaction between frictional and impact forces, which releases high dynamic energies.

In a number of known ball milling methods, once the particles reach a certain size they can re-combine at the same rate since they are being fractured, or do not fracture effectively, and therefore, do not reduce further in size. Thus, the manufacture of very fine particles by ball milling can require substantial efforts and there are also factors which consequently place limits on the minimum size of particles of active materials which can be achieved by such milling processes.

There is a need for processes that avoid the disadvantages of ball mills and ball milling processes.

Further, there is a need for economical processes where materials can be treated in a simple manner in the absence of ball milling.

Another need resides in providing processes wherein contaminates are avoided or minimized, and which processes are environmentally acceptable.

Yet another need resides in providing ball milling free and roll milling free processes for generating dispersions or coatings for substrates.

Additionally, there is a need for processes that avoid or minimize the formation of undesirable grinding media residues.

Also, another need resides in providing processes where dispersions with desirable and consistent characteristics are obtained in a direct economical manner, and that minimize the formation of contaminates.

Moreover, a further need relates to economical environmentally processes that produce dispersions with properties that enable the dispersions to be selected without further treatments, for the formation of xerographic components, such as intermediate transfer members, fuser rolls, donor rolls, pressure rolls, toner transfer belts and other roller surfaces, and where roll milling and ball milling are avoided, and resulting in components with excellent chemical, physical, and functional stability.

In addition, there is a need for the direct preparation of dispersions with desirable particle sizes that are more difficult to quickly achieve with ball milling, especially as this relates to the preparation of dispersions for xerographic belts and rolls, such as fuser belts, and intermediate transfer belts, and is cleaner (more environmentally acceptable) in that grinding media residues can be avoided or minimized.

There is a need for dispersions or mixtures prepared by mechanical blending, and which dispersions can be selected for the formation of intermediate transfer members with excellent break strengths as determined by their modulus measurements, which are readily releasable from substrates, and possess high glass transition temperatures, and improved stability with no or minimal degradation for extended time periods.

These and other needs and advantages are achievable in embodiments with the processes disclosed herein.

SUMMARY

Disclosed is a ball milling free and roll milling free process comprising the mechanical mixing of a mixture of ingredients comprising a polymer or a component that converts to a polymer, a perfluoropolyether phosphate, a conductive component and a solvent.

Also disclosed is a process comprising the first mechanical mixing of a mixture of ingredients comprising a perfluoropolyether phosphate, a conductive component, and a solvent to form a slurry thereof, subsequently adding to the slurry a polyamic acid, followed by a second mechanical mixing of the polyamic acid-containing slurry to form a dispersion.

Further disclosed is a process for the preparation of an intermediate transfer member which comprises the formation of a dispersion by the mechanical mixing of a perfluoropolyether phosphate, carbon black, and a solvent; adding to the resulting mixture a polyamic acid, applying said mixture to a stainless steel substrate, curing the resulting mixture by heating wherein the polyamic acid converts to a polyimide, releasing the mixture from said substrate, and then coating said mixture obtained on a supporting substrate; and wherein said perfluoropolyether phosphate is selected from the group consisting of those represented by at least one of the following formulas/structures

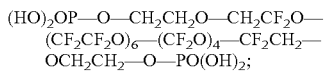

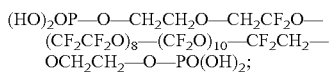

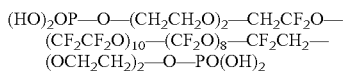

and

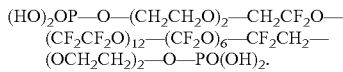

FIGURES

The following Figures are provided to further illustrate intermediate transfer members that are prepared from the disclosed processes.

Although the Figures focus on intermediate transfer members, the disclosed processes may be used to produce fuser rolls, donor rolls, pressure rolls, toner transfer belts, paper conveying belts and other xerographic components.

EMBODIMENTS

The terms "including", "includes", "having", "has", "with", or variants thereof are intended to be inclusive in a manner similar to the term "comprising". The term "at least one of" means, for example, that one or more of the listed items can be selected.

Any disclosed numerical value, however, inherently contains certain errors necessarily resulting from the standard deviation found in their respective testing measurements. Moreover, all ranges disclosed herein are to be understood to encompass any and all sub-ranges subsumed therein. For example, a range of from about 1 to about 10 can include any and all sub-ranges therebetween, such as 2, 3, 4, 5, 6, 7, 8, 9, and 10, and about can include ranges below 1 and ranges above 10.

Figure 1:
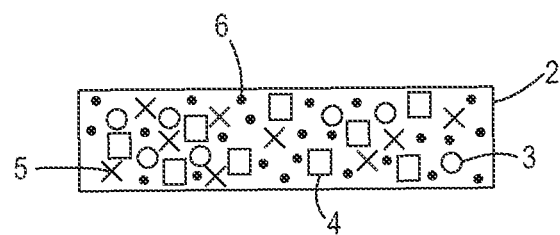
FIG. 1 illustrates an exemplary embodiment of a one-layer intermediate transfer member generated from dispersions of the present disclosure.

In FIG. 1 there is illustrated an intermediate transfer member comprising a layer 2 comprised of a perfluoropolyether phosphate 3, a polyimide, a polyphenyl sulfone, or optionally mixtures thereof 4, an optional siloxane polymer 5, and an optional conductive component 6.

Figure 2:
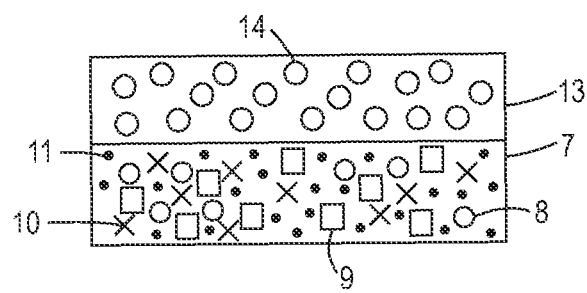
FIG. 2 illustrates an exemplary embodiment of a two-layered intermediate transfer member generated from dispersions of the present disclosure.

In FIG. 2 there is illustrated a two-layer intermediate transfer member comprising a bottom layer 7, comprising a perfluoropolyether phosphate 8, a polyimide, a polyphenyl sulfone, or optionally mixtures thereof 9, an optional siloxane polymer 10, and an optional conductive component 11, and an optional top or outer toner release layer 13 comprising release components 14.

Figure 3:
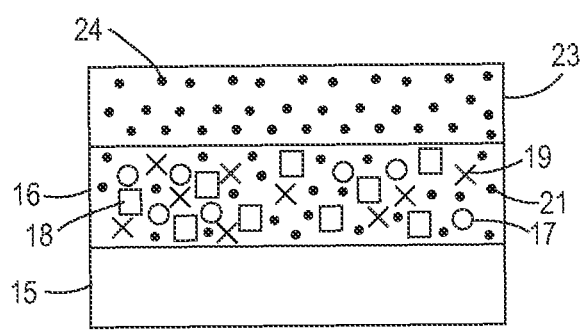
FIG. 3 illustrates an exemplary embodiment of a three-layer intermediate transfer member generated from dispersions of the present disclosure.

In FIG. 3 there is illustrated a three-layer intermediate transfer member comprising a supporting substrate 15, a layer thereover 16 comprising a perfluoropolyether phosphate 17, a polyimide, a polyphenyl sulfone, or optionally mixtures thereof 18, an optional siloxane polymer 19, and an optional conductive component 21, and an optional release layer 23 comprising release components 24.

Dispersion Processes

Dispersions of the present disclosure can be prepared by simple mechanical mixing processes, and in the absence of ball milling and roll milling.

In an embodiment of the present disclosure, the mechanical mixing process comprises providing or preparing a composition of a polymer, or a component that converts to a polymer, a conductive component, a perfluoropolyether phosphate and a solvent, and subjecting the resulting mixture to mechanical agitation, followed by filtration to form a dispersion. More specifically, the process of the present disclosure comprises the mechanical mixing of a conductive component, a perfluoropolyether phosphate, and a solvent to form a slurry, adding a polymer, or a component that converts to a polymer to the slurry, subjecting the slurry formed to mechanical mixing, and then optionally filtering the resulting dispersion.

The disclosed mechanical mixing can be accomplished at suitable temperatures, such as room temperature of from about 22° C. to about 25° C., with known mixing devices, commercially available, and where, for example, there is selected a magnetic stirrer, a vibrating stirrer, hand stirring with an elongated rod, such as a glass rod, shaking the mixture, repeatedly transferring the mixture from one container or flask to another container or flask, automatic controlled stirring using at least one paddle, hand stirring using at least one paddle, combinations thereof and the like. In an embodiment of the present disclosure, there can be for the mechanical mixing of the compositions an IKA RW20 Digital Mechanical Stirrer available from Fisher Scientific.

Mechanical stirring speeds can vary depending, for example, on the components being mixed and the devices selected. Generally stirring speeds and stirring times are selected that will permit the initial formation of slurries, and then the generation of dispersions from the formed slurry. Examples of stirring speeds are from about 50 to about 250 revolutions per minute (RPM), from about 50 to about 200 revolutions per minute, from about 75 to about 175 revolutions per minute, from about 100 to about 150 revolutions per minute, from about 105 to about 135 revolutions per minute, and from about 115 to about 125 revolutions per minute.

The stirring times are dependent on a number of factors, such as the components and amounts thereof present, the stirring mechanism selected, the process sequence, that is the formation of a slurry and the formation of the dispersion, and the specific stirring devices used. However generally the stirring times are from about 1 hour to about 25 hours, from about 5 hours to about 20 hours, from about 6 hours to about 20 hours, from about 2 hours to about 8 hours, and from about 3 hours to about 7 hours. For the generation of a slurry the more specific stirring times can be from about 2 to about 8 hours and from 4 to about 7 hours. From about 4 to about 25 hours and from about 6 to about 20 hours of stirring time can be selected for converting the slurry into a dispersion. The resulting dispersion can then be filtered with various known filters, such as paper and cloth filters with suitable pore sizes of, for example, from about 15 to about 150 microns, from about 20 to about 100 microns, and from about 35 to about 75 microns.

More specifically, the disclosed mixtures can be prepared in accordance with the following Scheme where a mixture of carbon black (CB), a perfluoropolyether (PFPE) phosphate combination release additive/leveling agent/dispersing agent, available from Solvay Solexis, contained in the disclosed solvents, such N-methyl pyrrolidone (NMP), can be stirred to form a slurry thereof. There can be added to the formed slurry a polymer or a component that converts to a polymer, such as a polyamic acid, followed by mechanical stirring, and where there results a polymer or polyamic acid/carbon black/perfluoropolyether phosphate/NMP coating dispersion, which dispersion can then be filtered to form the final coating dispersion.

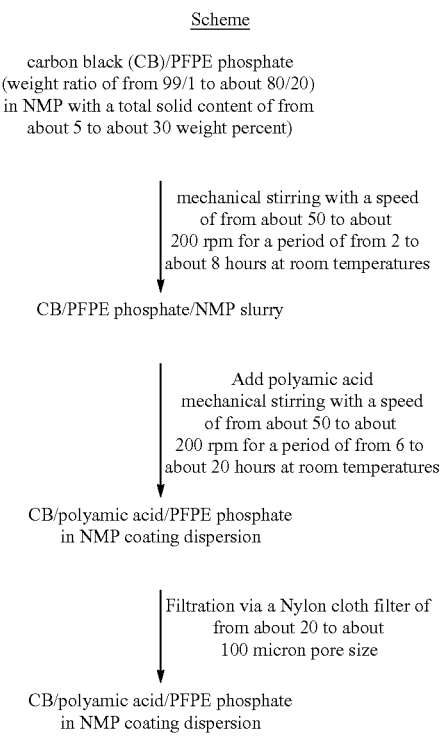

Subsequent to the preparation of the disclosed dispersions, they can be selected for the generation of xerographic components, such as intermediate transfer members, fuser rolls, donor rolls, pressure rolls, toner transfer belts, paper conveying belts, and other surfaces, and where for example, the dispersions can be applied to a metal substrate, followed by the self release thereof. The product obtained can then be selected for the xerographic components disclosed herein or the products can be coated on supporting substrates. For example, intermediate transfer members can be prepared in accordance with the following disclosures, it being noted that other xerographic components and paper conveyor belts can be prepared in a similar manner.

The disclosed dispersions can be selected as a liquid coating dispersion mixture that can be flow coated on a metal substrate like a stainless steel substrate, aluminum, nickel, copper, and alloys thereof, and glass plates, and subsequently optionally cured by heating at, for example, from about 50° C. to about 95° C. or from about 50° C. about 75° C. for from about 20 to about 50 minutes, or from about 25 to about 35 minutes, followed by heating at from about 175° C. to about 210° C., or from about 180° C. to about 195° C. for from about 20 to about 45 minutes, or from about 25 to about 35 minutes, and then further heating at from about 290° C. to about 340° C., or from about 300° C. to about 325° C. for from about 40 minutes to about 80 minutes or for from about 50 minutes to about 65 minutes. The resulting member which can be in the configuration of a belt, after drying and cooling to room temperature, about 22° C. to about 25° C., readily released, without the assistance of any external processes, from the metal substrate. That is, the members obtained immediately release, or self-release, such as for example, within from about 1 to about 15 seconds, from about 1 to about 10 seconds, from about 5 to about 15 seconds, from about 5 to about 10 seconds, or about 1 second without any external assistance, from the metal substrate, such as a stainless steel substrate. Also, the efficiently and economically formed mixture film will fully separate, such as for example, a separation of from about 90 to about 100 percent, or from about 95 to about 99 percent from metal substrates, and where release materials and separate release layers can be avoided.

The disclosed prepared coating dispersion mixtures can then be flow coated on a metal substrate like a stainless steel substrate, aluminum, nickel, copper, and alloys thereof, and glass plates, and subsequently, optionally cured by heating at, for example, from about 50° C. to about 75° C. for from about 25 to about 35 minutes, followed by heating at from about 180° C. to about 195° C. for from about 25 to about 35 minutes, and then further heating at from about 300° C. to about 325° C. for from about 50 minutes to about 65 minutes. The resulting member film with a flat configuration, and with no curl, after drying and cooling to room temperature, about 22° C. to about 25° C., readily released, without the assistance of any external processes, from the metal substrate. That is, the films obtained immediately release, or self-release, such as for example, within from about 1 to about 15 seconds, from about 1 to about 10 seconds, from about 5 to about 15 seconds, from about 5 to about 10 seconds, or about 1 second without any external assistance, from the metal substrate, such as a stainless steel substrate. Also, the efficiently and economically formed films will fully separate, such as for example, a separation of from about 90 to about 100 percent, or from about 95 to about 99 percent from metal substrates, and where release materials and separate release layers can be avoided.

The self-released disclosed coating dispersion mixtures can be selected as a xerographic component, such as an intermediate transfer member, or the film resulting can be coated on the optional supporting substrates illustrated herein, by liquid spray coating, dip coating, wire wound rod coating, fluidized bed coating, powder coating, electrostatic spraying, sonic spraying, blade coating, molding, laminating, and the like. The optional supporting substrate can be formed in various shapes, such as a belt, or a film using suitable materials that are non-conductive or conductive with the thickness of the coating, such as those for intermediate transfer members being, for example, from about 30 to about 1,000 microns, from about 100 to about 800 microns, from about 150 to about 500 microns, from about 100 to about 125 microns, or from about 75 to about 80 microns. In embodiments, the intermediate transfer film coating mixture subsequent to optional curing can have a thickness of, for example, from about 30 to about 400 microns, from about 15 to about 150 microns, from about 20 to about 100 microns, from about 50 to about 200 microns, from about 70 to about 150 microns, or from about 25 to about 75 microns.

Intermediate Transfer Members

The disclosed xerographic components, such as intermediate transfer members, can be comprised of a mixture of a polymer, such as a polyimide, a polyphenyl sulfone, or mixtures thereof, a conductive component and a perfluoropolyether phosphate, which composition self releases from a metal substrate, such as stainless steel, and where an external release layer on the metal substrate can be avoided.

Polyimides

Examples of polymers, such as polyimides selected for the mixtures illustrated herein, can be formed from a polyimide precursor of a polyamic acid that includes one of a polyamic acid of pyromellitic dianhydride/4,4'-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline, a polyamic acid of benzophenone tetracarboxylic dianhydride/4,4'-oxydianiline/phenylenediamine, and the like, and mixtures thereof. After curing by heating, the resulting polyimides include a polyimide of pyromellitic dianhydride/4,4'-oxydianiline, a polyimide of pyromellitic dianhydride/phenylenediamine, a polyimide of biphenyl tetracarboxylic dianhydride/4,4'-oxydianiline, a polyimide of biphenyl tetracarboxylic dianhydride/phenylenediamine, a polyimide of benzophenone tetracarboxylic dianhydride/4, 4'-oxydianiline, a polyimide of benzophenone tetracarboxylic dianhydride/4,4'-oxydianiline/phenylenediamine, and mixtures thereof.

Commercially available examples of polyamic acids of pyromellitic dianhydride/4,4'-oxydianiline selected include PYRE-ML® RC-5019 (about 15 to 16 weight percent in N-ethyl-2-pyrrolidone, NMP), RC-5057 (about 14.5 to 15.5 weight percent in NMP/aromatic hydrocarbon=80/20), and RC-5083 (about 18 to 19 weight percent in NMP/DMAc=15/85), all available from Industrial Summit technology Corp., and Parlin, N.J.; DURIMIDE® 100, commercially available from FUJIFILM Electronic Materials U.S.A., Inc.

Polyamic acids of biphenyl tetracarboxylic anhydride/phenylenediamine examples include U-VARNISH® A and S (about 20 weight percent in NMP), both available from UBE America Inc., New York, N.Y., BPDA resin (about 16.8 weight percent in NMP), available from Kaneka Corporation, and TX, PI-2610 (about 10.5 weight percent in NMP) and PI-2611 (about 13.5 weight percent in NMP), both available from HD MicroSystems, Parlin, N.J.

Examples of polyamic acids of benzophenone tetracarboxylic dianhydride/4,4'-oxydianiline include RP46 and RP50 (about 18 weight percent in NMP), both available from Unitech Corp., Hampton, Va.

Polyamic acids of benzophenone tetracarboxylic dianhydride/4,4'-oxydianiline/phenylenediamine examples are PI-2525 (about 25 weight percent in NMP), PI-2574 (about 25 weight percent in NMP), PI-2555 (about 19 weight percent in NMP/aromatic hydrocarbon=80/20), and PI-2556 (about 15 weight percent in NMP/aromatic hydrocarbon/propylene glycol methyl ether=70/15/15), all available from HD MicroSystems, Parlin, N.J.

More specifically, polyamic acid or esters of polyamic acid examples that can be selected for the formation of a polyimide are prepared by the reaction of a dianhydride and a diamine. Suitable dianhydrides selected include aromatic dianhydrides and aromatic tetracarboxylic acid dianhydrides such as, for example, 9,9-bis(trifluoromethyl)xanthene-2,3,6,7-tetracarboxylic acid dianhydride, 2,2-bis(3,4-dicarboxyphenyl)hexafluoropropane dianhydride, 2,2-bis((3,4-dicarboxyphenoxy)phenyl)hexafluoropropane dianhydride, 4,4'-bis(3,4-dicarboxy-2,5,6-trifluorophenoxy)octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxyl)phenyl)ether dianhydride, di-(4-(3,4-dicarboxyphenoxyl)phenyl) sulfide dianhydride, di-(3,4-dicarboxyphenyl)methane dianhydride, di-(3,4-dicarboxyphenyl) ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3', 4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(2,3-dicarboxyphenyl)ether dianhydride, bis(3,4-dicarboxyphenyl)sulfone dianhydride, bis(2,3-dicarboxyphenyl)sulfone 2,2-bis(3,4-dicarboxyphenyl)-1,1,1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis (2,3-dicarboxyphenyl)methane dianhydride, bis(3,4-dicarboxyphenyl)methane dianhydride, 4,4'-(p-phenylenedioxy) diphthalic dianhydride, 4,4'-(m-phenylenedioxy)diphthalic dianhydride, 4,4'-diphenylsulfidedioxybis(4-phthalic acid) dianhydride, 4,4'-diphenylsulfonedioxybis(4-phthalic acid) dianhydride, methylenebis(4-phenyleneoxy-4-phthalic acid) dianhydride, ethylidenebis(4-phenyleneoxy-4-phthalic acid) dianhydride, isopropylidenebis(4-phenyleneoxy-4-phthalic acid)dianhydride, hexafluoroisopropylidenebis(4-phenyleneoxy-4-phthalic acid)dianhydride, and the like.

Exemplary diamines suitable for use in the preparation of the polyamic acids include 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis-(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3-bis-(gamma-aminopropyl)-tetramethyl-disiloxane, 1,6-diaminohexane, 4,4'-diaminodiphenylmethane, 3,3'-diaminodiphenylmethane, 1,3-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluoro-biphenyl, 4,4'-diamino-2,2',3,3',5,5',6,6'-octafluorodiphenyl ether, bis[4-(3-aminophenoxy)-phenyl]sulfide, bis[4-(3-aminophenoxyl)phenyl]sulfone, bis[4-(3-aminophenoxyl)phenyl]ketone, 4,4'-bis(3-aminophenoxy)biphenyl, 2,2-bis[4-(3-aminophenoxyl)phenyl]-propane, 2,2-bis[4-(3-aminophenoxyl)phenyl]-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl)propane, and 2,2-di(p-aminophenyl)-1,1,1,3,3,3-hexafluoropropane, and the like, and mixtures thereof.

The dianhydrides and diamines are, for example, selected in a weight ratio of from about 20:80 to about 80:20, a weight ratio of from about 60/40 to about 40/60 and about a 50:50 weight ratio.

Polyimide examples selected for the disclosed xerographic components, such as an intermediate transfer member layer mixture, can be represented by at least one of the following formulas/structures, and mixtures thereof

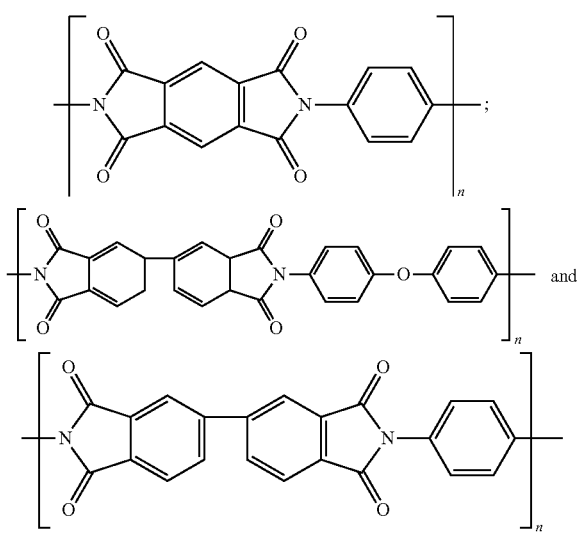

where n represents the number of repeating segments of, for example, from about 5 to about 3,000, from about 50 to about 2,000, from about 50 to about 1,500, from about 200 to about 1,200, from about 1,000 to about 2,000, from about 1,200 to about 1,800, or from about 20 to about 200.

Polyphenylsulfones

Polyphenylsulfones, polysulfones and polyethersulfones are polymers that can be selected for the mixtures disclosed herein. Commercially obtainable polysulfone examples include UDEL® P-1700, P-3500; commercially obtainable polyphenylsulfone examples include RADEL® 5000NT, 5100NT15, 5900NT; commercially obtainable polyethersulfone examples include RADEL® A-200A, AG-210NT, AG-320NT, VERADEL® 3000P, 3100P, 3200P, all available or obtainable from Solvay Advanced Polymers, LLC, Alpharetta, Ga. In an embodiment, the number average molecular weight of each of the polysulfone, the polyphenylsulfone and the polyethersulfone is, for example, from about 2,000 to about 50,000, or from about 4,000 to about 20,000, and the weight average molecular weight of the polysulfones, the polyphenylsulfones, and the polyethersulfones are, for example, from about 10,000 to about 200,000, or from about 50,000 to about 150,000.

Perfluoropolyether Phosphates

Perfluoropolyether phosphate examples selected for the disclosed mixtures, which mixtures can be selected for the formation of xerographic components, such as intermediate transfer members and fuser members, are polyperfluoroethoxymethoxy difluoroethyl poly(ethylene glycol) phosphate, perfluoropolyether acid phosphate, perfluoropolyether poly(ethylene glycol) phosphate, diphosphoric acid, polymers with ethoxylated reduced ethyl esters of reduced polymerized oxidized tetrafluoroethylene, and mixtures thereof.

The perfluoropolyether phosphates, which can function as a dispersing agent for the conductive components like carbon black when present, and as a leveling agent and release additive for the disclosed mixtures can be represented by the following formula/structure

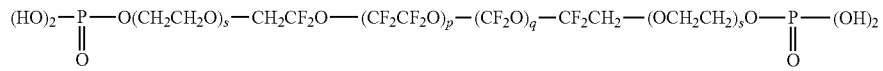

wherein s represents the number of groups and is, for example, 1 or 2, and where p/q represents the ratio of the respective segments, and which ratio can vary depending, for example, on the amounts of perfluoropolyether phosphates selected, examples of the p/q ratio being from about 0.5 to about 3, from about 0.7 to about 1, from about 0.8 to about 2.5, or from about 0.5 to about 0.8. In embodiments, the value of p can be, for example, from about 6 to about 12, and the value of q can be, for example, from about 3 to about 11.

Specific examples of perfluoropolyether phosphates selected for the disclosed mixtures can be selected from the group consisting of those represented by the following structures/formulas and mixtures thereof

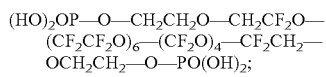

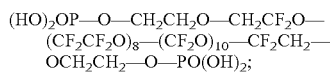

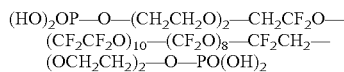

and

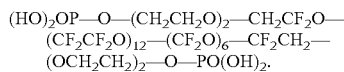

Yet further specific examples of perfluoropolyether phosphates selected for the disclosed mixtures and encompassed by the illustrated herein formulas/structures include FLUOROLINK® F10 (average molecular weight=2,400 to 3,100), and FOMBLIN® HC/P2-1000 (average molecular weight=2, 500), both available from Solvay Solexis.

Various amounts of a perfluoropolyether phosphate can be selected for the mixtures and dispersions illustrated herein, such as for example, from about 0.01 weight percent to about 5 weight percent (of solids throughout), from about 0.1 to about 1 weight percent, from about 0.1 to about 0.9 weight percent, from about 0.1 to about 1.5 weight percent, from about 0.03 to about 0.4 weight percent, from about 0.03 to about 0.1 weight percent, from about 0.01 to about 0.5 weight percent, from about 0.01 to about 0.05 weight percent, from about 0.01 to about 5 weight percent, or less than or equal to about 0.6 weight percent. In embodiments, a composition mixture of the polymer and the perfluoropolyether phosphate are present in a weight ratio of from about 99.99/0.01 to 95/5 with the polymer/conductive component/perfluoropolyether phosphate ratio being from about 50/49.99/0.01 to about 90/5/5 or about 88/11.4/0.6.

One specific disclosed intermediate transfer member coating comprises a mixture of a polyimide of biphenyl tetracarboxylic dianhydride/phenylenediamine, a conductive component, and the disclosed perfluoropolyether phosphate prepared in a solvent illustrated herein from about 10 to about 20 percent by weight of solids.

The disclosed polymer/perfluoropolyether phosphate containing intermediate transfer member mixtures possess, for example, a Young's modulus of from about 4,000 to about 10,000 MPa, from about 5,000 to about 10,000 MPa, from about 6,500 to about 7,500 MPa, from about 6,000 to about 10,000 MPa, from about 7,800 to about 7,900 MPa, and from about 7,500 to about 8,000 MPa; and an onset decomposition temperature of greater than about 150° C. inclusive of from about 400° C. to about 650° C., from about 500° C. to about 640° C., from about 600° C. to about 630° C., from about 160 to about 400° C., and from about 170° C. to about 350° C.

The disclosed glass transition temperatures can be determined by a number of known methods, and more specifically, by Differential Scanning calorimetry (DSC). For the disclosed molecular weights, such as $M_w$ (weight average) and $M_n$ (number average), they can be measured by a number of known methods, and more specifically, by Gel Permeation Chromatography (GPC).

The perfluoropolyether phosphates, which can simultaneously function as a release agent or additive, a leveling agent, and a dispersing agent in contrast to utilizing three different substances are compatible with the coating solution mixtures described herein. Additionally, the resulting polyamic acid/perfluoropolyether phosphate containing mixtures or compositions, after final curing, self-release from metal substrates like stainless steel and a thick smooth polyimide/conductive component/perfluoropolyether phosphate composition mixture can be obtained.

Optional Conductive Components or Fillers

The disclosed mixtures may optionally contain one or more conductive components or fillers to, for example, alter and adjust the conductivity of the mixtures. Thus, where an intermediate transfer member one layer structure is prepared, the conductive filler can be included in the mixture containing the perfluoropolyether phosphates disclosed herein. However, where there is prepared a multi-layer structure, the conductive filler can be included in one or more layers of the member, such as in the supporting substrate, the polymer layer, or mixtures thereof coated thereon, or in both the supporting substrate and the polymer layer inclusive of the release layer when present.

For example, suitable conductive components or fillers include carbon blacks, metal oxides, polyanilines, graphite, acetylene black, fluorinated carbon blacks, other known suitable fillers, and mixtures of thereof.

Examples of carbon black fillers that can be selected for the mixtures illustrated herein include special black 4 (B.E.T. surface area=180 $m^2/g$, DBP absorption=1.8 ml/g, primary particle diameter=25 nanometers) available from Evonik-Degussa, special black 5 (B.E.T. surface area=240 $m^2/g$, DBP absorption=1.41 ml/g, primary particle diameter=20 nanometers), color black FW1 (B.E.T. surface area=320 $m^2/g$, DBP absorption=2.89 ml/g, primary particle diameter=13 nanometers), color black FW2 (B.E.T. surface area=460 $m^2/g$, DBP absorption=4.82 ml/g, primary particle diameter=13 nanometers), color black FW200 (B.E.T. surface area=460 $m^2/g$, DBP absorption=4.6 ml/g, primary particle diameter=13 nanometers), all available from Evonik-Degussa; VULCAN® carbon blacks, REGAL® carbon blacks, MONARCH® carbon blacks, and BLACK PEARLS® carbon blacks available from Cabot Corporation. Specific examples of conductive carbon blacks are BLACK PEARLS® 1000 (B.E.T. surface area=343 $m^2/g$, DBP absorption=1.05 ml/g), 880 (B.E.T. surface area=240 $m^2/g$, DBP absorption=1.06 ml/g), 800 (B.E.T. surface area=230 $m^2/g$, DBP absorption=0.68 ml/g), L (B.E.T. surface area=138 $m^2/g$, DBP absorption=0.61 ml/g), 570 (B.E.T. surface area=110 $m^2/g$, DBP absorption=1.14 ml/g), 170 (B.E.T. surface area=35 $m^2/g$, DBP absorption=1.22 ml/g), VULCAN® XC72 (B.E.T. surface area=254 $m^2/g$, DBP absorption=1.76 ml/g), XC72R (fluffy form of VULCAN® XC72), XC605, XC305, REGAL® 660 (B.E.T. surface area=112 $m^2/g$, DBP absorption=0.59 ml/g), 400 (B.E.T. surface area=96 $m^2/g$, DBP absorption=0.69 ml/g), 330 (B.E.T. surface area=94 $m^2/g$, DBP absorption=0.71 ml/g), MONARCH® 880 (B.E.T. surface area=220 $m^2/g$, DBP absorption=1.05 ml/g, primary particle diameter=16 nanometers), and 1000 (B.E.T. surface area=343 $m^2/g$, DBP absorption=1.05 ml/g, primary particle diameter=16 nanometers); channel special carbon black 4 and channel special carbon black 5, available from Orion and Channel carbon blacks available from Evonik-Degussa. Other known suitable carbon blacks not specifically disclosed herein may be selected as the filler or conductive component for the intermediate transfer members disclosed herein.

Examples of polyaniline fillers that can be selected for incorporation into the disclosed mixtures are PANIPOL™ F, commercially available from Panipol Oy, Finland; and known lignosulfonic acid grafted polyanilines. These polyanilines usually have a relatively small particle size diameter of, for example, from about 0.5 to about 5 microns; from about 1.1 to about 2.3 microns, or from about 1.5 to about 1.9 microns.

Metal oxide fillers that can be selected for the disclosed mixtures include, for example, tin oxide, antimony doped tin oxide, antimony dioxide, titanium dioxide, indium oxide, zinc oxide, indium-doped tin trioxide, indium tin oxide, and titanium oxide.

Suitable antimony doped tin oxide fillers for the disclosed mixtures include antimony doped tin oxides coated on an inert core particle, such as ZELEC® ECP-S, M and T, available from DuPont Chemicals, Jackson Laboratories, Deepwater, N.J., and those antimony doped non-core containing tin oxides, such as, ZELEC® ECP-3005-XC and ZELEC® ECP-3010-XC; available from DuPont Chemicals, Jackson Laboratories, Deepwater, N.J. The core particle may be mica, $TiO_2$ or acicular particles having a hollow or a solid core.

Commercially available from E.I. DuPont or DuPont Chemicals examples of antimony doped tin oxide fillers are ZELEC® ECP 1610-S, 2610-S, 3610-S, 1703-S, 2703-S, 1410-M, 3005-XC, 3010-XC, 1410-T, 3410-T, S-X1, ZELEC® ECP powders that include an acicular hollow shell, an equiaxial titanium dioxide core product (ZELEC® ECP-T), and a plate shaped mica core product (ZELEC® ECP-M).

The antimony doped tin oxide particles can be prepared by densely layering a thin layer of antimony doped tin oxide onto the surface of a silica shell or silica-based particle, wherein the shell, in turn, has been deposited onto a core particle. Also, the antimony doped tin oxide particles are fine enough in size to provide adequate transparency. The silica may either be a hollow shell or layered on the surface of an inert core to form a solid structure.

When present, the filler can be selected in an amount of, for example, from about 0.1 to about 50 weight percent, from about 1 to about 60 weight percent, from about 1 to about 40 weight percent, from about 3 to about 40 weight percent, from about 4 to about 30 weight percent, from about 10 to about 30 percent, from about 10 to about 25 weight percent, from about 5 to about 30 weight percent, from about 15 to about 20 weight percent, or from about 5 to about 20 weight percent based on the total of the solid ingredients in which the filler is included.

Optional Polysiloxane Polymers

The disclosed mixtures can also further comprise a polysiloxane polymer. Examples of polysiloxane polymers selected for the mixtures disclosed herein include known suitable polysiloxanes, such as a copolymer of a polyether and a polydimethylsiloxane, commercially available from BYK Chemical as BYK® 333, 330 (about 51 weight percent in methoxypropylacetate), and 344 (about 52.3 weight percent in xylene/isobutanol, ratio of 80/20); BYK®-SILCLEAN 3710 and 3720 (about 25 weight percent in methoxypropanol); a copolymer of a polyester and a polydimethylsiloxane, commercially available from BYK Chemical as BYK® 310 (about 25 weight percent in xylene), and 370 (about 25 weight percent in xylene/alkylbenzenes/cyclohexanone/monophenylglycol, ratio of 75/11/7/7); a copolymer of a polyacrylate and a polydimethylsiloxane, commercially available from BYK Chemical as BYK®-SILCLEAN 3700 (about 25 weight percent in methoxypropylacetate); a copolymer of polyester polyether and a polydimethylsiloxane, commercially available from BYK Chemical as BYK® 375 (about 25 weight percent in di-propylene glycol monomethyl ether); and mixtures thereof.

The polysiloxane polymer, or copolymers thereof can be included in the disclosed mixtures and members thereof in an amount of, for example, from about 0.1 to about 10 weight percent, from about 0.01 to about 1 weight percent, from about 0.05 to about 1 weight percent, from about 0.05 to about 0.5 weight percent, from about 0.1 to about 0.5 weight percent, from about 0.2 to about 0.5 weight percent, or from about 0.1 to about 0.3 weight percent based on the total weight of the solid components or ingredients present.

Optional Supporting Substrates

When desired, a supporting substrate can be selected, such as beneath the disclosed perfluoropolyether phosphate containing mixture layer. The supporting substrate can be included to provide increased rigidity or strength to the xerographic components generated.

The disclosed perfluoropolyether phosphate containing coating dispersions can be applied on various suitable supporting substrate materials to form dual layer members. Exemplary supporting substrate materials include polyimides, polyamideimides, polyetherimides, mixtures thereof, and the like.

More specifically, examples of supporting substrates are polyimides inclusive of known low temperature, and rapidly cured polyimide polymers, such as VTEC™ PI 1388, 080-051, 851, 302, 203, 201, and PETI-5, all available from Richard Blaine International, Incorporated, Reading, Pa., polyamideimides, polyetherimides, and the like. The thermosetting polyimides can be cured at temperatures of from about 180° C. to about 260° C. over a short period of time, such as from about 10 to about 120 minutes, or from about 20 to about 60 minutes, and generally have a number average molecular weight of from about 5,000 to about 500,000 or from about 10,000 to about 100,000, and a weight average molecular weight of from about 50,000 to about 5,000,000 or from about 100,000 to about 1,000,000. Also, for the supporting substrate there can be selected thermosetting polyimides that can be cured at temperatures of above 300° C., such as PYRE M.L.® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

Examples of polyamideimides that can be selected as supporting substrates for the xerographic members, such as intermediate transfer members disclosed herein, are VYLOMAX® HR-11NN (15 weight percent solution in N-methylpyrrolidone, $T_g$=300° C., and $M_w$=45,000), HR-12N2 (30 weight percent solution in N-methylpyrrolidone/xylene/methyl ethyl ketone=50/35/15, $T_g$=255° C., and $M_w$=8,000), HR-13NX (30 weight percent solution in N-methylpyrrolidone/xylene=67/33, $T_g$=280° C., and $M_w$=10,000), HR-15ET (25 weight percent solution in ethanol/toluene=50/50, $T_g$=260° C., and $M_w$=10,000), HR-16NN (14 weight percent solution in N-methylpyrrolidone, $T_g$=320° C., and $M_w$=100,000), all commercially available from Toyobo Company of Japan, and TORLON® Al-10 ($T_g$=272° C.), commercially available from Solvay Advanced Polymers, LLC, Alpharetta, Ga.

Specific examples of polyetherimide supporting substrates that can be selected are ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

Optional Release Layers

When desired, an optional top release layer can be included in the described xerographic components, such as intermediate transfer members, in the configuration of a layer deposited over the disclosed perfluoropolyether phosphate mixture containing layer. The release layer can be included to especially assist in providing toner cleaning and additional developed image transfer efficiency from a photoconductor to the intermediate transfer member.

When selected, the release layer can have any desired and suitable thickness. For example, the release layer can have a thickness of from about 1 to about 100 microns, from about 10 to about 75 microns, or from about 20 to about 50 microns.

The optional release layer can comprise TEFLON®-like materials including fluorinated ethylene propylene copolymers (FEP), polytetrafluoroethylene (PTFE), polyfluoroalkoxy polytetrafluoroethylene (PFA TEFLON®), and other TEFLON®-like materials; silicone materials, such as fluorosilicones and silicone rubbers, such as Silicone Rubber 552, available from Sampson Coatings, Richmond, Va., polydimethyl siloxane/dibutyl tin diacetate, 0.45 gram DBTDA per 100 grams polydimethyl siloxane rubber mixture with a molecular weight $M_w$ of approximately 3,500; and fluoroelastomers, such as those available as VITON®, such as copolymers and terpolymers of vinylidenefluoride, hexafluoropropylene, and tetrafluoroethylene, which are known commercially under various designations as VITON® A, E, E60C, E45, E430, B910, GH, B50, and GF. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON® A; (2) a class of terpolymers of vinylidenefluoride, hexafluoropropylene, and tetrafluoroethylene, known commercially as VITON® B; and (3) a class of tetrapolymers of vinylidenefluoride, hexafluoropropylene, tetrafluoroethylene, and a cure site monomer, such as VITON® GF, having 35 mole percent of vinylidenefluoride, 34 mole percent of hexafluoropropylene, and 29 mole percent of tetrafluoroethylene with 2 percent cure site monomer. The cure site monomers can be selected from those available from E.I. DuPont de Nemours, Inc. such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomers.

Solvents

A solvent or mixtures thereof can be included in the mixtures and dispersions illustrated herein. Examples of the solvents selected are toluene, hexane, cyclohexane, heptane, tetrahydrofuran, methyl ethyl ketone, methyl isobutyl ketone, N,N'-dimethylformamide, N,N'-dimethylacetamide, N-methyl pyrrolidone (NMP), methylene chloride, mixtures thereof, and the like, where the solvent is selected in, for example, an amount of from about 70 weight percent to about 95 weight percent, or from 80 weight percent to about 90 weight percent based on the amounts of components in the coating mixture.

Specific embodiments will now be described in detail. These examples are intended to be illustrative, and are not limited to the materials, conditions, or process parameters set forth in these embodiments. All parts are percentages by solid weight unless otherwise indicated. Further, although the present disclosure and Examples focuses on the preparation of intermediate transfer members, fuser rolls, donor rolls, pressure rolls, toner transfer belts, and other roller surfaces can be prepared from the described mixtures or dispersions illustrated herein, and where roll milling and ball milling are avoided.

COMPARATIVE EXAMPLE 1

There was prepared a coating dispersion of a polyamic acid, which polyamic acid converts after curing by heating into the polyimide of biphenyl tetracarboxylic dianhydride/phenylenediamine of the following formula/structure

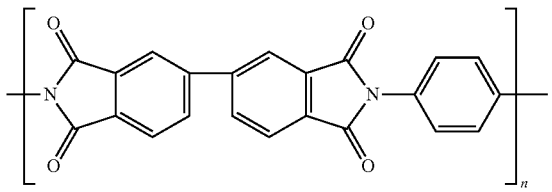

wherein n is about 30.

More specifically, an intermediate transfer coating dispersion was prepared by providing a mixture of Special Carbon Black 4, available from Orion Chemicals, a solvent of N-ethyl-2-pyrrolidone (NMP), the polyamic acid of biphenyl tetracarboxylicdianhydride/phenylenediamine, and the leveling agent NOVEC™ FC-4432, a fluoro surfactant available from 3M, about 18 weight percent of solids, and which mixture was subjected to ball milling with 2 millimeters stainless steel shots via an Attritor grinding mill for 18 hours. There resulted a coating dispersion of the polyamic acid of biphenyl tetracarboxylicdianhydride/phenylenediamine/carbon black/leveling agent contained dispersed in NMP, where the weight ratio of polyamic acid of biphenyl tetracarboxylicdianhydride/phenylenediamine/carbon black/leveling agent was 88.8/11/0.2, and which dispersion was filtered through a 20 micron Nylon cloth filter.

The above prepared liquid coating dispersion was flow coated on a stainless steel substrate, and subsequently cured at 75° C. for 30 minutes, 190° C. for 30 minutes, and 320° C. for 60 minutes. The resulting polyimide containing intermediate transfer member, thickness of 50 microns, did not release from the stainless steel substrate until after soaking in water for about two months. Further, because a ball milling method was utilized, there resulted the formation of undesirable grinding residues and contaminated steel balls, which would have to be periodically cleaned or replaced at considerable costs.

The carbon black particle size of the dispersion was measured to be about 150 nanometers with a narrow size distribution using a MALVERN HPPS5001 dynamic light scattering instrument.

COMPARATIVE EXAMPLE 2

There was prepared a coating dispersion of a polyamic acid, which polyamic acid converts after curing by heating into the polyimide of biphenyl tetracarboxylic dianhydride/phenylenediamine of the following formula/structure

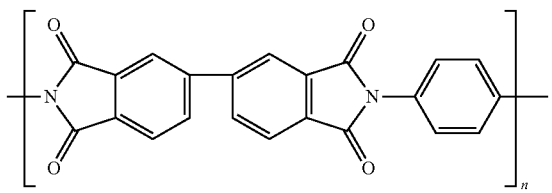

wherein n is about 30.

More specifically, an intermediate transfer coating dispersion was prepared by providing a mixture of Special Carbon Black 4, available from Orion Chemicals, the solvent N-ethyl-2-pyrrolidone (NMP), the polyamic acid of biphenyl tetracarboxylicdianhydride/phenylenediamine, and the leveling agent NOVEC™ FC-4432, a fluoro surfactant available from 3M, about 18 weight percent of solids, and which mixture was subjected to mechanical stirring at a speed of about 200 rpm for 48 hours. There resulted a coating dispersion of the polyamic acid of biphenyl tetracarboxylicdianhydride/phenylenediamine/carbon black/leveling agent contained in NMP, where the weight ratio of polyamic acid of biphenyl tetracarboxylicdianhydride/phenylenediamine/carbon black/leveling agent was 88.8/11/0.2, and which dispersion could not be effectively filtered through a 20 micron Nylon cloth filter due to the very large particle sizes present in the dispersion.

The carbon black particle size of the small amount of the filtered-through dispersion was measured to be about 200 nanometers with a wide size distribution using a MALVERN HPPS5001 dynamic light scattering instrument.

An intermediate transfer member could not be prepared from the above dispersion.

EXAMPLE I

There was prepared a coating dispersion containing a polyamic acid of biphenyl tetracarboxylicdianhydride/phenylenediamine, which polyamic acid converts after curing with heating into the polyimide of biphenyl tetracarboxylic dianhydride/phenylenediamine of the following formulas/structures

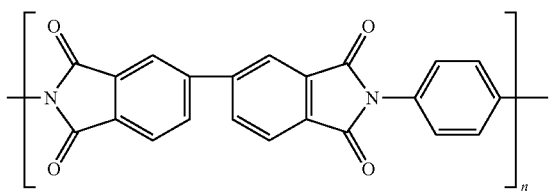

wherein n is about 30.

In the absence of the Comparative Example 1 ball milling with 2 millimeter stainless steel shots via an Attritor grinding mill, and with mechanical mixing only for 3 hours with a stirring blade connected to an elongated rod, an intermediate transfer belt (ITB) coating dispersion was prepared in accordance with the following Scheme where a mixture of Special Carbon Black 4 (CB), available from Orion Chemicals, the perfluoropolyether phosphate (PFPE phosphate) release additive/leveling agent/dispersing agent FLUOROLINK® F10, weight average molecular weight of from about 2,400 to about 3,100, available from Solvay Solexis, and with a carbon black/PFPE phosphate weight ratio of 100/5, contained in the solvent NMP, about 18 weight percent solids.

Subsequently, there was added to the above formed slurry the polyamic acid of biphenyl tetracarboxylicdianhydride/ phenylenediamine followed by mechanical stirring with a stirring blade connected to an elongated rod, and at a stirring speed of 100 revolutions per minute for 18 hours, after which there resulted a polyamic acid/carbon black/perfluoro-polyether phosphate phosphate/NMP coating dispersion, with a weight ratio of 88.45/11/0.55, which dispersion was readily filtered through a 20 micron Nylon cloth filter.

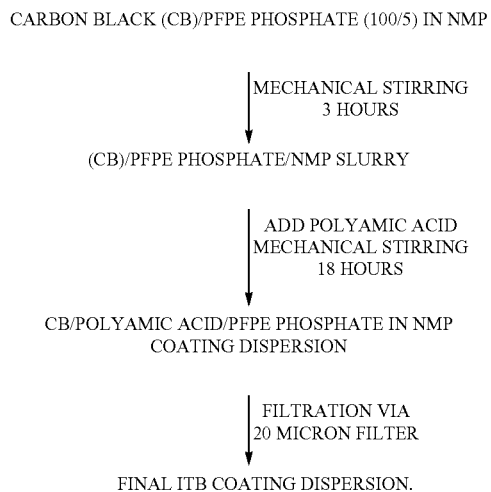

There resulted a final coating dispersion without the formation of undesirable grinding residues, and at a cost of about 65 percent less than the Comparative Example 1 dispersion ball milling process.

The above prepared intermediate transfer belt (ITB) final liquid coating dispersion was flow coated on a stainless steel substrate, and subsequently cured at 75° C. for 30 minutes, 190° C. for 30 minutes, and then 320° C. for 60 minutes followed by cooling down to room temperature, about 25° C., that caused the conversion of the polyamic acid to the polyimide illustrated. The resulting intermediate transfer member polyimide/carbon black/perfluoropolyether phosphate with the weight ratio of 88.45/11/0.55, thickness of 50 microns, self-released without the assistance of any external processes in about 5 seconds from the stainless steel substrate. Accomplishing self-release within a range of from about 1 to about 10 seconds is highly desirable.

The carbon black particle size of the dispersion was measured to be about 100 nanometers with a very narrow size distribution using a MALVERN HPPS5001 dynamic light scattering instrument.

The coefficient of thermal expansion (CTE, the thermal strain per degree of temperature change) of the above intermediate transfer members of Comparative Example 1, and Example I were measured using a Thermo-mechanical Analyzer (TMA). The samples were cut using a razor blade and metal die to 4-millimeter wide pieces which were then mounted between the TMA clamps using the 8-millimeter spacing. The samples were pre-loaded to a force of 0.05 N. The CTE values were obtained as a linear fit through the data between −20° C. to 50° C. using the TMA software.

Young's Modulus was measured following the known ASTM D882-97 process. Samples (0.5 inch×12 inch) where each of the intermediate transfer members of Comparative Example 1, and Example I were placed in a commercially available InstronTensile Tester measurement apparatus, and then the samples were elongated at a constant pull rate until breaking. During this time, there was recorded the resulting load versus the sample elongation. The Young's Modulus value was calculated by taking any point tangential to the initial linear portion of the recorded curve results and dividing the tensile stress by the corresponding strain. The tensile stress was calculated by dividing the load by the average cross sectional area of each of the test samples. The tensile stress at which the sample strip broke was recorded as break strength.

The above ITB members of Comparative Example 1 and Example I were measured for surface resistivity (averaging four to six measurements at varying spots, 72° F./65 percent room humidity) using a High Resistivity Meter (Hiresta-Up MCP-HT450 available from Mitsubishi Chemical Corp.).

The following results were obtained:

| Example Number | CTE (ppm/° K)a) | Young's Modulus (MPa) | Break strength (MPa) | Resistivity (ohm/square) |
|---|---|---|---|---|
| Comarative Example 1 | 30 | 6,000 | 163 | $5.6 \times 10^{10}$ |
| Example I | 24 | 7,860 | 196 | $4.5 \times 10^{10}$ |

The coating dispersion of Example I was prepared with no milling primarily because the disclosed perfluoropolyether phosphate was an excellent dispersing agent for carbon black. In contrast, the Comparative Example 1 coating dispersion was prepared by ball milling, which was a complex, energy-consuming and costly process. In the Comparative Example 2, where no ball milling and no PFPE phosphate were present, there did not result a useful coating dispersion in that a majority of the mixture could not be filtered, and remained on the filter surface.

In addition, the resulting intermediate transfer member of Example I showed improved stability and mechanical properties such as about 30 percent higher modulus, about 20 percent higher break strength, and about 20 percent lower CTE over the Comparative Example 1 intermediate transfer member.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A process of mixing, excluding ball milling and roll milling, comprising mechanical mixing of a mixture of ingredients comprising a polymer or a component that converts to a polymer, a perfluoropolyether phosphate, a conductive component and a solvent, wherein said perfluoropolyether phosphate is represented by the formula:

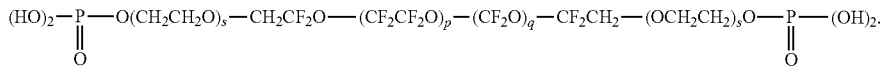

wherein p is from 6 to 12, q is from 3 to 11, the ratio of p/q is from about 0.5 to about 3, and s is both 1 or both 2.

2. A process in accordance with claim 1 wherein said mechanical mixing is accomplished by a magnetic stirrer, a vibrating stirrer, hand stirring with an elongated rod, shaking the mixture, repeatedly transferring the mixture from one container to another container, automatic controlled stirring using at least one paddle or hand stirring using at least one paddle, and optionally wherein said component that converts to a polymer is a polyamic acid.

3. A process in accordance with claim 1 wherein said mechanical mixing is accomplished with stirring at a stirring speed of from about 50 to about 250 revolutions per minute for a period of time of from about 1 hour to about 25 hours.

4. A process in accordance with claim 1 wherein said mechanical mixing is accomplished with stirring at a stirring speed of from about 50 to about 200 revolutions per minute for a period of time of from about 2 hours to about 20 hours.

5. A process in accordance with claim 1 wherein said mechanical mixing is accomplished with stirring at a stirring speed of from about 50 to about 200 revolutions per minute for a period of time of from about 2 to about 8 hours thereby forming a slurry, followed by a second mixing with stirring at a stirring speed of from about 50 to about 200 revolutions per minute for a time period of from about 4 hours to about 25 hours, and wherein said component that converts to a polymer is a polyamic acid.

6. A process in accordance with claim 1 wherein said mechanical mixing comprises a first mixing with stirring at a stirring speed of from about 75 to about 175 revolutions per minute for a period of time of from about 2 to about 8 hours thereby forming a slurry, followed by a second mixing with stirring at a stirring speed of from about 50 to about 200 revolutions per minute for a period of time of from about 6 to about 20 hours, and subsequently filtering the resulting dispersion, and wherein said component that converts to a polymer is a polyamic acid.

7. A process in accordance with claim 6 wherein subsequent to said second mechanical mixing the filtering is accomplished with a filter with a pore size of from about 20 to about 100 microns.

8. A process in accordance with claim 1 wherein said solvent is selected from the group consisting of toluene, hexane, cyclohexane, heptane, tetrahydrofuran, methyl ethyl ketone, methyl isobutyl ketone, N,N'-dimethylformamide, N,N'-dimethylacetamide, N-methyl pyrrolidone (NMP), methylene chloride, and mixtures thereof.

9. A process in accordance with claim 1 wherein the weight ratio of the polymer or component that converts into a polymer, conductive component, perfluoropolyether phosphate is from about 50/49.99/0.01 to about 90/5/5.

10. A process in accordance with claim 1 wherein said mechanical mixing comprises a first mechanical mixing of a mixture comprising said conductive component, said perfluoropolyether phosphate, and said solvent to form a slurry, followed by a second mechanical mixing of said slurry with said component that converts to a polymer, and wherein said component that converts to a polymer is a polyamic acid.

11. A process in accordance with claim 10 wherein said polyamic acid is cured by heating to convert said acid into a polyimide.

12. A process in accordance with claim 1 wherein said polymer is a polyphenylsulfone, a polysulfone, or a polyethersulfone.

13. A process in accordance with claim 1 wherein said perfluoropolyether phosphate is present in an amount of from about 0.01 to about 5 weight percent of total solids

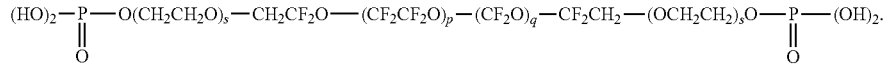

14. A process in accordance with claim 1 wherein said perfluoropolyether phosphate is selected from the group consisting of those represented by at least one of the following

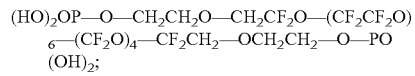

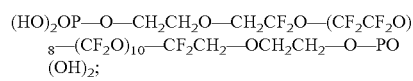

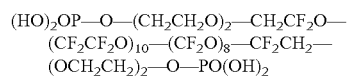

and

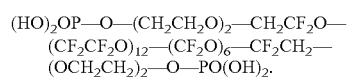

15. A process in accordance with claim 1 wherein said polymer is a polyimide as represented by at least one of the following formulas/structures

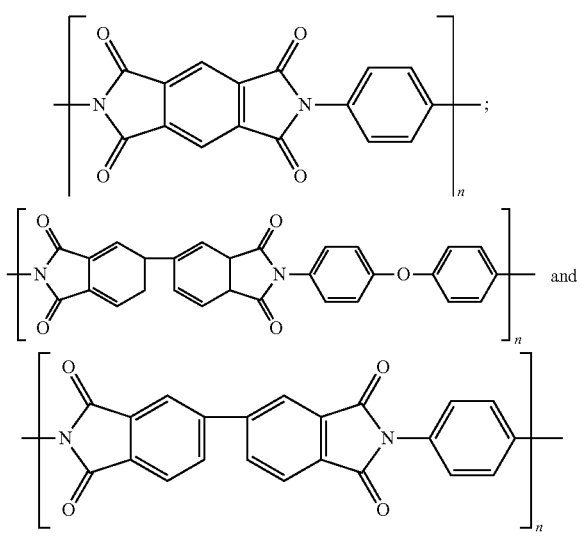

wherein n represents the number of repeating segment of from about 20 to about 200.

16. A process in accordance with claim 1 wherein said conductive component is selected from the group consisting of carbon blacks, metal oxides, polyanilines, and mixtures thereof.

17. A process in accordance with claim 1 wherein said perfluoropolyether phosphate simultaneously functions as an internal release additive, a leveling agent, and a dispersing agent.

18. A process in accordance with claim 1 wherein said mixture further comprises a polysiloxane polymer selected from the group consisting of a polyester modified polydimethylsiloxane, a polyether modified polydimethylsiloxane, a polyacrylate modified polydimethylsiloxane, and a polyester polyether modified polydimethylsiloxane.

19. A process in accordance with claim 1 wherein said polymer is a polyimide, said conductive component is carbon black, and said phosphate is represented by the following formula

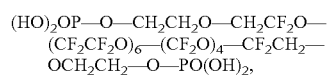

(HO)$_2$OP—O—CH$_2$CH$_2$O—CH$_2$CF$_2$O—(CF$_2$CF$_2$O)$_6$—(CF$_2$O)$_4$—CF$_2$CH$_2$—OCH$_2$CH$_2$—O—PO(OH)$_2$, and wherein said dispersion is selected for the generation of xerographic members.

20. A process comprising the first mechanical mixing of a mixture of ingredients comprising a perfluoropolyether phosphate, a conductive component, and a solvent to form a slurry thereof, subsequently adding to the slurry a polyamic acid, followed by a second mechanical mixing of the polyamic acid-containing slurry to form a dispersion and wherein said perfluoropolyether phosphate is represented by the following formulas/structures

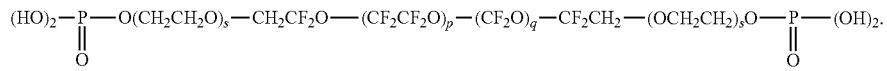

wherein p is from about 6 to about 12, q is from about 3 to about 11, and s is both 1 or both 2.

21. A process in accordance with claim 20 wherein (1) the solvent is selected from the group consisting of toluene, hexane, cyclohexane, heptane, tetrahydrofuran, methyl ethyl ketone, methyl isobutyl ketone, N,N'-dimethylformamide, N,N'-dimethylacetamide, N-methyl pyrrolidone (NMP), methylene chloride, and mixtures thereof, and wherein
(2) subsequent to curing said polyamic acid converts into a polyimide,
(3) said first mixing is at a stirring speed of from about 50 to about 200 revolutions per minute for a period of time of from about 2 to about 8 hours thereby forming said slurry,
(4) followed by said second mixing at a stirring speed of from about 50 to about 200 revolutions per minute for a period of time of from about 6 hours to about 20 hours,
(5) and subsequently filtering the resulting dispersion, and optionally wherein said mechanical mixing is accomplished by a magnetic stirrer, a vibrating stirrer, hand stirring with an elongated rod, shaking the mixture, repeatedly transferring the mixture from one container to another container, automatic controlled stirring using at least one paddle, or hand stirring using at least one paddle.

* * * * *